US010796404B2

(12) United States Patent
He (10) Patent No.: US 10,796,404 B2
(45) Date of Patent: Oct. 6, 2020

(54) AIRCRAFT SYSTEMS AND METHODS FOR ADJUSTING A DISPLAYED SENSOR IMAGE FIELD OF VIEW

(71) Applicant: HONEYWELL INTERNATIONAL INC., Morris Plains, NJ (US)

(72) Inventor: Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 11 days.

(21) Appl. No.: 15/665,976

(22) Filed: Aug. 1, 2017

(65) Prior Publication Data

US 2019/0043164 A1   Feb. 7, 2019

(51) Int. Cl.
| G06T 3/40 | (2006.01) |
| G02B 27/01 | (2006.01) |
| G01C 23/00 | (2006.01) |
| B64D 43/00 | (2006.01) |
| G06F 3/0482 | (2013.01) |
| G06F 3/0484 | (2013.01) |
| H04N 7/18 | (2006.01) |

(52) U.S. Cl.
CPC .............. *G06T 3/40* (2013.01); *B64D 43/00* (2013.01); *G01C 23/005* (2013.01); *G02B 27/01* (2013.01); *G06F 3/0482* (2013.01); *G06F 3/04845* (2013.01); *H04N 7/18* (2013.01); *G02B 2027/0141* (2013.01)

(58) Field of Classification Search
CPC .. G06T 3/40; B64D 43/00; H04N 7/18; G06F 3/0482; G06F 3/04845
See application file for complete search history.

(56) References Cited

U.S. PATENT DOCUMENTS

| 7,605,719 | B1 | 10/2009 | Wenger et al. |
| 7,852,236 | B2 | 12/2010 | Feyereisen et al. |
| 7,965,223 | B1 * | 6/2011 | McCusker ............ G01S 13/913 340/961 |
| 8,831,798 | B1 * | 9/2014 | Barber .................. G01C 23/00 340/945 |

(Continued)

FOREIGN PATENT DOCUMENTS

| EP | 2228626 A2 | 9/2010 |
| EP | 2339565 A1 | 6/2011 |
| EP | 2416124 A2 | 2/2012 |

OTHER PUBLICATIONS

Extended EP Search Report for Application No. 18184327.7 dated Jan. 3, 2019.

*Primary Examiner* — Barry Drennan
*Assistant Examiner* — Khoa Vu
(74) *Attorney, Agent, or Firm* — Lorenz & Kopf, LLP (57) ABSTRACT

A vehicle system and method are provided. The system includes a control module coupled to an imaging system and a display system. The control module receives position and location information of the aircraft, and processes that with map features to identify a landing location. The control module commands the display system to render on display system a landing image having thereon a sensor based visually enhanced area defined by a field of view (FOV) of first dimensions. The control module continually receives and processes visibility reports to determine the visibility at the landing location. When there is low visibility at the landing location, the control module reduces the FOV dimensions.

16 Claims, 4 Drawing Sheets

(56) References Cited

U.S. PATENT DOCUMENTS

| | | | |
|---|---|---|---|
| 8,874,288 B1* | 10/2014 | Siddiqui | G01C 23/00 701/1 |
| 8,914,166 B2 | 12/2014 | He | |
| 8,976,042 B1* | 3/2015 | Chiew | G08G 5/0021 340/945 |
| 9,096,354 B2 | 8/2015 | Baudson et al. | |
| 9,407,826 B1 | 8/2016 | Tiana | |
| 9,428,056 B2 | 8/2016 | Kneuper et al. | |
| 9,489,575 B1 | 11/2016 | Whalen et al. | |
| 2005/0007261 A1* | 1/2005 | Berson | G01C 23/00 340/945 |
| 2011/0106345 A1* | 5/2011 | Takacs | G05D 1/0676 701/16 |
| 2011/0304479 A1* | 12/2011 | Chen | G08G 5/0021 340/951 |
| 2012/0035789 A1* | 2/2012 | He | G01C 23/005 701/16 |
| 2016/0155341 A1* | 6/2016 | Gannon | G08G 5/0056 701/16 |

\* cited by examiner

AIRCRAFT SYSTEMS AND METHODS FOR ADJUSTING A DISPLAYED SENSOR IMAGE FIELD OF VIEW

TECHNICAL FIELD

The present invention generally relates to aircraft flight deck displays, and more particularly relates to adjusting the field of view (FOV) of a sensor based image on combined and enhanced flight vision systems.

BACKGROUND

Aircraft and aircraft systems continue to advance in sophistication, particularly with respect to aircraft flight deck display systems. Flight instruments and associated aircraft flight deck display systems are used on aircraft to integrate information from data sources and to perform, or assist a user in performing, functions related to, for example, flight planning, guidance and navigation, and performance management. The easier it is for the pilot to obtain and understand the information provided by these flight instruments and aircraft flight deck display systems, the more likely that the pilot will be able to successfully navigate the aircraft.

One type of aircraft flight deck display system is an enhanced flight vision system (EFVS) that places real-time sensor images onto displays, such as a head up displays (HUD) for flight crews to view directly. However, in common low visibility approach conditions, the sensor based image may be quite noisy and contains no relevant signature for approach and landing operations for large part or most of approach operations; therefore, enhancing it may not provide utility. Low visibility conditions for aircraft operation generally comprise scenarios in which weather and/or other environmental factors inhibit visibility of direct view and reduce the operation range of electronic vision sensors. When the sensor based image is noisy, it may not be providing sufficiently useful information to the pilot and crew. A noisy sensor based image may even become a distraction to the viewing experience of the other information displayed on the aircraft flight deck display system, in which case the pilot or crew may prefer to minimize it, or only retain a portion of sensor image on display in anticipation of useful information appearing most likely in these regions to aid the landing.

Accordingly, improvements to conventional EFVS for aircraft are desirable. Specifically, improved enhanced flight vision systems and methods capable providing visibility-based modification of the area of the sensor based image are desirable. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An embodiment of a control module for an enhanced vision system on an aircraft is provided. The control module comprising: a memory device; and a processor coupled to the memory device, the processor configured to: receive aircraft position and location information from a navigation system; retrieve, from a database, airport features; process the aircraft position and location information with the airport features to determine a landing location; receive imaging data from an imaging system; command the display system to render a landing image based on the image data, the landing image having thereon a visually enhanced area defined by a field of view (FOV) having first dimensions; and reduce the FOV to second dimensions, responsive to a received airport visibility report.

In another embodiment, an enhanced vision system for an aircraft is provided. The system comprising: an imaging system configured to generate image data corresponding to a forward looking viewpoint of the aircraft; a display system comprising a primary flight display (PFD); and a control module coupled to the imaging system and the display system, the control module comprising a memory device, a database, and a processor, and configured to: receive position and location information of the aircraft; process the aircraft position and location information with map features to identify a runway; command the display system to render on the PFD a landing image based on the image data, the landing image having thereon a visually enhanced area defined by a field of view (FOV) with first dimensions; and process a received visibility report to determine that a low visibility condition is underway at the runway; command the display system reduce the FOV to second dimensions responsive to determining the low visibility condition is underway at the runway.

Also provided is a method for an enhanced vision system on an aircraft. The method comprising: at a control module, receiving image data from an imaging system, the image data corresponding to a forward looking viewpoint of the aircraft; receiving, from a navigation system, position and location information for the aircraft; processing the aircraft position and location information with map features to identify a runway; receiving a visibility report associated with the runway; continuously generating display commands for a landing image based on the image data, aircraft position and location information, and map features; and modifying dimensions of a field of view (FOV) of a visually enhanced area on the landing image based on the visibility report and predetermined thresholds; and at a display system comprising a primary flight display (PFD), rendering the landing image on the PFD responsive to receiving the display commands.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any theory presented in the preceding background or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module (FIG. 1, 104), and may be separate from, or integrated within, a preexisting mobile platform management system, avionics system, or aircraft flight management system (FMS).

Exemplary embodiments of the disclosed control module provide an enhancement over conventional Enhanced Flight Vision Systems (EFVS), by modifying the Field Of View (FOV) of a sensor based image on an aircraft flight deck display responsive to received visibility information. The sensor image FOV 251 (FIG. 2) is an image rendered on an aircraft flight deck display, generally on a primary flight display (PFD). In operation, the novel control module for adjusting the FOV of a sensor image on an enhanced flight vision system (shortened herein to "control module for an enhanced vision system," or simply, "control module" 104 FIG. 1) processes current phase of flight and navigation information with received visibility information and rules defining "bad" visibility. Upon determining that there is currently bad visibility at the target landing location, the FOV of a sensor based image is reduced on a display system 114.

Figure 1:
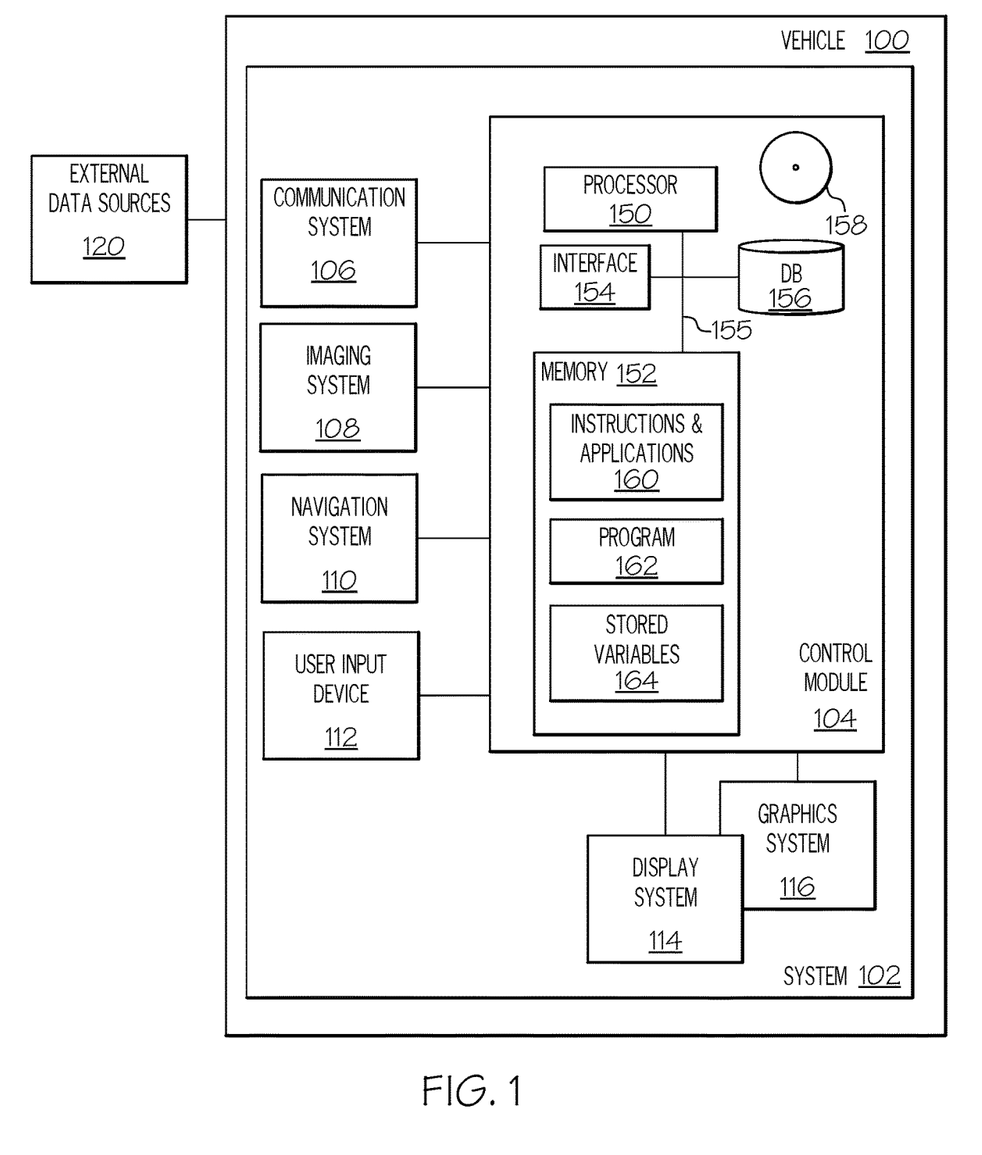
FIG. 1 is a block diagram of a vehicle system according to an exemplary embodiment.

Turning now to FIG. 1, a functional block diagram of a vehicle 100 including a vehicle system 102 for adjusting the FOV of a sensor based image on an enhanced flight vision system (shortened herein to "enhanced vision system for an aircraft" or "vehicle system" 102) is depicted, in accordance with various exemplary embodiments. In the depicted embodiment, the vehicle system 102 includes: the control module 104 that is operationally coupled to a communication system 106, an imaging system 108, a navigation system 110, a user input device 112, a display system 114, and a graphics system 116. The operation of these functional blocks is described in more detail below. In the described embodiments, the depicted vehicle system 102 is generally realized as an aircraft flight deck display system within a vehicle 100 that is an aircraft; however, the concepts presented here can be deployed in a variety of mobile platforms, such as land vehicles, spacecraft, watercraft, and the like. Accordingly, in various embodiments, the vehicle system 102 may be associated with or form part of larger aircraft management system, such as a flight management system (FMS).

In the illustrated embodiment, the control module 104 is coupled to the communications system 106, which is configured to support communications between external data source(s) 120 and the aircraft. External source(s) 120 may comprise air traffic control (ATC), or other suitable command centers and ground locations. Data received from the external source(s) 120 includes the instantaneous, or current, visibility report associated with a target landing location or identified runway. In this regard, the communications system 106 may be realized using a radio communication system or another suitable data link system.

The imaging system 108 is configured to use sensing devices to generate video or still images, and provide image data therefrom. The imaging system 108 may comprise one or more sensing devices, such as cameras, each with an associated sensing method. Accordingly, the video or still images generated by the imaging system 108 may be referred to herein as generated images, sensor images, or sensed images, and the image data may be referred to as sensed data. In an embodiment, the imaging system 108 comprises an infrared ("IR") based video camera, low-light TV camera, or a millimeter wave (MMW) video camera. The IR camera senses infrared radiation to create an image in a manner that is similar to an optical camera sensing visible light to create an image. In another embodiment, the imaging system 108 comprises a radar based video camera system. Radar based systems emit pulses of electromagnetic radiation and listen for, or sense, associated return echoes. The radar system may generate an image or video based upon the sensed echoes. In another embodiment, the imaging system 108 may comprise a sonar system. The imaging system 108 uses methods other than visible light to generate images, and the sensing devices within the imaging system 108 are much more sensitive than a human eye. Consequently, the generated images may comprise objects, such as mountains, buildings, or ground objects, that a pilot might not otherwise see due to low visibility conditions.

In various embodiments, the imaging system 108 may be mounted in or near the nose of the aircraft (vehicle 100) and calibrated to align an imaging region with a viewing region of a primary flight display (PFD) or a Head Up display (HUD) rendered on the display system 114. For example, the imaging system 108 may be configured so that a geometric center of its field of view (FOV) is aligned with or otherwise corresponds to the geometric center of the viewing region on the display system 114. In this regard, the imaging system 108 may be oriented or otherwise directed substantially parallel to an anticipated line-of-sight for a pilot and/or crew member in the cockpit of the aircraft to effectively capture a forward looking cockpit view in the respective displayed image. In some embodiments, the displayed images on the display system 114 are three dimensional, and the imaging system 108 generates a synthetic perspective view of terrain in front of the aircraft. The synthetic perspective view of terrain in front of the aircraft is generated to match the direct out-the-window view of a crew member, and may be based on the current position, attitude, and pointing information received from a navigation system 110, or other aircraft and/or flight management systems.

Navigation system 110 is configured to provide real-time navigational data and/or information regarding operation of the aircraft. The navigation system 110 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 110, as will be appreciated in the art. The navigation system 110 is capable of obtaining and/or determining the current or instantaneous position and location information of the aircraft (e.g., the current latitude and longitude) and the current altitude or above ground level for the aircraft. Additionally, in an exemplary embodiment, the navigation system 110 includes inertial reference sensors capable of obtaining or otherwise determining the attitude or orientation (e.g., the pitch, roll, and yaw, heading) of the aircraft relative to earth.

The user input device 112 is coupled to the control module 104, and the user input device 112 and the control module 104 are cooperatively configured to allow a user (e.g., a pilot, co-pilot, or crew member) to interact with the display system 114 and/or other elements of the vehicle system 102 in a conventional manner. The user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. In embodiments using a touch sensitive screen, the user input device 112 may be integrated with a display device. Non-limiting examples of uses for the user input device 112 include: entering values for stored variables 164, loading or updating instructions and applications 160, and loading and updating the contents of the database 156, each described in more detail below.

The generated images from the imaging system 108 are provided to the control module 104 in the form of image data. The control module 104 is configured to receive the image data and convert and render the image data into display commands that command and control the renderings of the display system 114. This conversion and rendering may be performed, at least in part, by the graphics system 116. In some embodiments, the graphics system 116 may be integrated within the control module 104; in other embodiments, the graphics system 116 may be integrated within the display system 114. Regardless of the state of integration of these subsystems, responsive to receiving display commands from the control module 104, the display system 114 displays, renders, or otherwise conveys one or more graphical representations or displayed images based on the image data (i.e., sensor based images) and associated with operation of the vehicle 100, as described in greater detail below. In various embodiments, images displayed on the display system 114 may also be responsive to processed user input that was received via a user input device 112.

In general, the display system 114 may include any device or apparatus suitable for displaying flight information or other data associated with operation of the aircraft in a format viewable by a user. Display methods include various types of computer generated symbols, text, and graphic information representing, for example, pitch, heading, flight path, airspeed, altitude, runway information, waypoints, targets, obstacle, terrain, and required navigation performance (RNP) data in an integrated, multi-color or monochrome form. In practice, the display system 114 may be part of, or include, a primary flight display (PFD) system, a panel-mounted head down display (HDD), a head up display (HUD), or a head mounted display system, such as a "near to eye display" system. The display system 114 may comprise display devices that provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two-dimensional or three, and may support the overlay of text, alphanumeric information, or visual symbology.

As mentioned, the control module 104 performs the functions of the vehicle system 102. With continued reference to FIG. 1, within the control module 104, the processor 150 and the memory 152 (having therein the program 162) form a novel processing engine that performs the described processing activities in accordance with the program 162, as is described in more detail below. The control module 104 generates display signals that command and control the display system 114. In particular, the control module 104 determines the FOV dimensions of the sensor image to display on the PFD, and commands and controls the display system 114 accordingly. Upon receiving the display commands, and responsive thereto, the display system 114 renders respective sensor based "displayed images" having the FOV described herein. The control module 104 provides a technological improvement over conventional EFVS methods and display systems by modifying the FOV of a sensor based image responsive to a current visibility report.

The control module 104 includes an interface 154, communicatively coupled to the processor 150 and memory 152 (via a bus 155), database 156, and an optional storage disk 158. In various embodiments, the control module 104 performs actions and other functions in accordance with steps of a method 400 described in connection with FIG. 4. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

The memory 152, the database 156, or a disk 158 maintain data bits and may be utilized by the processor 150 as both storage and a scratch pad. The memory locations where data bits are maintained are physical locations that have particular electrical, magnetic, optical, or organic properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164. The database 156 and the disk 158 are computer readable storage media in the form of any suitable type of storage apparatus, including direct access storage devices such as hard disk drives, flash systems, floppy disk drives and optical disk drives. The database may include an airport database (comprising airport features) and a terrain database (comprising terrain features). In combination, the features from the airport database and the terrain database are referred to map features. Information in the database 156 may be organized and/or imported from an external source 120 during an initialization step of a process (see initialization 402 FIG. 4).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The interface 154 enables communications within the control module 104, can include one or more network interfaces to communicate with other systems or components, and can be implemented using any suitable method and apparatus. For example, the interface 154 enables communication from a system driver and/or another computer system. In one embodiment, the interface 154 obtains data from external data source(s) 120 directly. The interface 154 may also include one or more network interfaces to communicate with technicians, and/or one or more storage interfaces to connect to storage apparatuses, such as the database 156.

It will be appreciated that the vehicle system 102 may differ from the embodiment depicted in FIG. 1. As mentioned, the vehicle system 102 can be integrated with an existing flight management system (FMS) or aircraft flight deck display.

During operation, the processor 150 loads and executes one or more programs, algorithms and rules embodied as instructions and applications 160 contained within the memory 152 and, as such, controls the general operation of the control module 104 as well as the vehicle system 102. In executing the process described herein, such as the method 400 of FIG. 4, the processor 150 specifically loads and executes the novel program 162. Additionally, the processor 150 is configured to process received inputs (any combination of input from the communication system 106, the imaging system 108, the navigation system 110, and user input provided via user input device 112), reference the database 156 in accordance with the program 162, and generate display commands that command and control the display system 114 based thereon.

A target landing location, or runway, may have been part of a flight plan that was received by the control module 104 prior to flight, may be received during flight, or may be decided during flight. Regardless of its source, during an approach and landing operation of an aircraft, the control module 104 determines or identifies the target landing location, such as an airport runway. Although especially relevant during an approach and landing operation, the processor 150 is configured to receive a current visibility report associated with the target landing location from an external data source 120. For example, a current airport visibility report, containing airport visibility information, may be obtained through voice or electronic automatic terminal information service (ATIS) broadcasting. The ATIS report, also referred to herein as the visibility report, may include a weather report, and may include a variety of other cause and quantification information about conditions that affect visibility at the target landing location. In a first example, a visibility report indicates that smog is currently inhibiting visibility at the target landing location. In a second example, there may be smog and fog affecting visibility at the target landing location. Other examples may include inhibited visibility due to blowing dust, blowing snow, or chemical gasses. The novel control module 104 includes rules and predetermined thresholds defining "low visibility" for a plurality of such scenarios that affect visibility. In some scenarios, a pilot or user may utilize user input device 112 to set low visibility conditions, in accordance with according ATIS and/or other weather reports. Based on the rules and thresholds, and user input, the control module 104 processes the received visibility report and determines the visibility at the target landing location. Specifically, the control module 104 determines when respective low visibility conditions are currently underway at the target landing location.

The control module 104 modifies the FOV 251 (FIG. 2) dimensions of a sensor based displayed image, selectively responsive to one or more of: the visibility at the target landing location, pilot selected visibility conditions, and a user selection of a relevant portion of the sensor image to be displayed. In some embodiments, the control module 104 reduces the FOV 251 by keeping the geometric center of the FOV 251 the same and reducing the FOV 251 two or more of the FOV's 251 first dimensions (generally, the x and the y dimensions). In other embodiments, the control module 104 reduces the FOV 251 by placing the geometric center of the FOV 251 on a target feature location (such as a landing signature) and reducing two or more of the FOV's 251 first dimensions (also the x and the y dimensions) around the target feature location. In addition, input from the user may be processed in the determination of final dimensions for a reduced FOV 351 (FIG. 3), as is described in more detail below. Upon determining that the aircraft has landed, the FOV 351 may be modified back, or restored, to its first dimensions (i.e., back to FOV 251).

Figure 2:
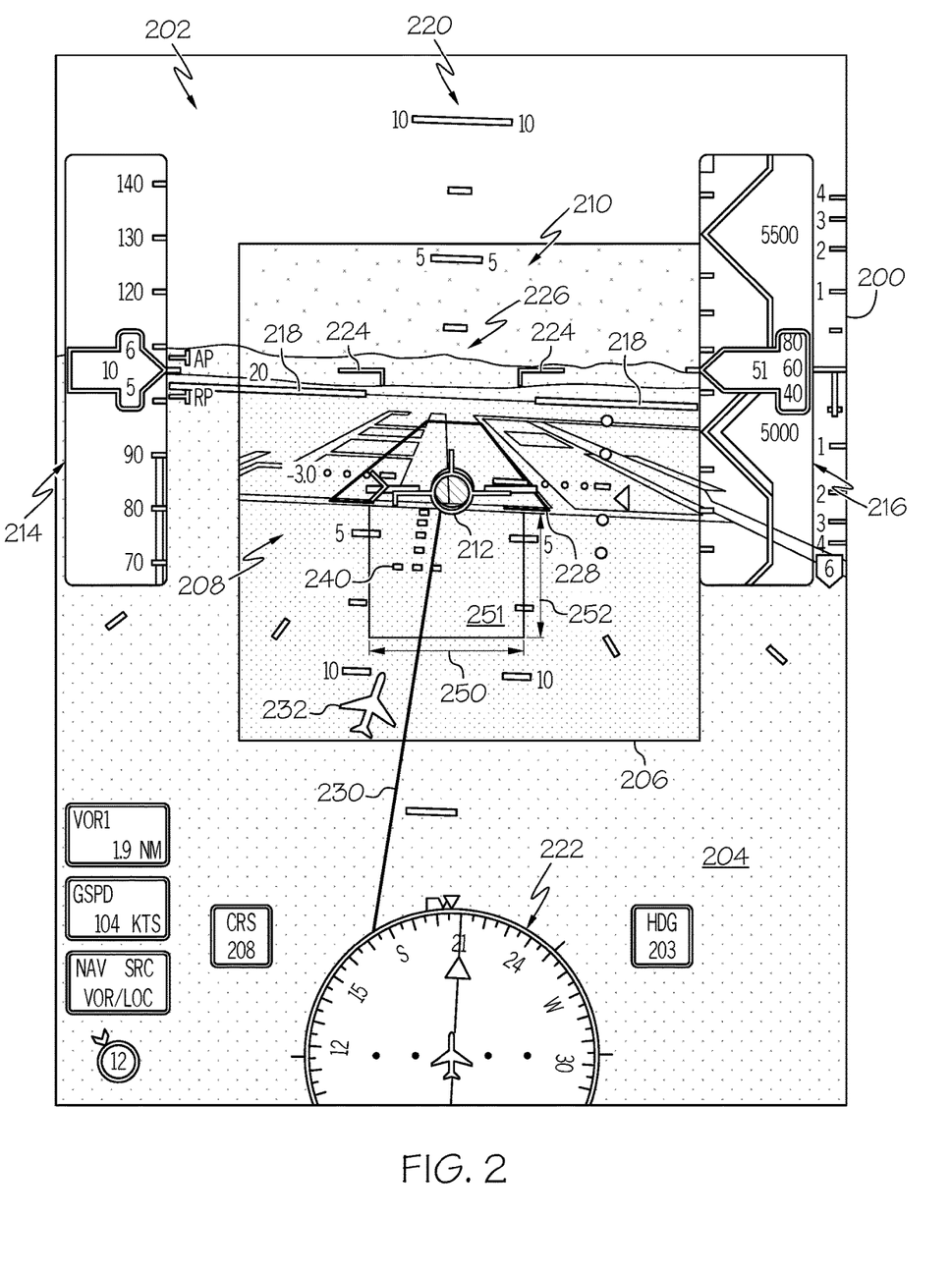
FIG. 2 is an image generated by the vehicle system of FIG. 1 according to an exemplary embodiment.

Referring now to FIG. 2, and with continued reference to FIG. 1, in an exemplary embodiment, the control module 104 controls the rendering on a flight deck display 200 on the display system 114. As illustrated in FIG. 2, in an exemplary embodiment, the flight deck display 200 includes a primary flight display 202. It should be appreciated that flight deck display 200 as depicted in FIG. 2 represents the state of a dynamic display frozen at one particular time, and that the flight deck display 200 may be continuously refreshed during operation of the aircraft to reflect changes in the altitude, position, and location of the aircraft.

In the illustrated embodiment, primary flight display PFD 202 includes several features that are graphically rendered, including, without limitation a synthetic perspective view of terrain 204, a reference symbol 212 corresponding to the current flight path of the aircraft, an airspeed indicator 214 (or airspeed tape) that indicates the current airspeed of the aircraft, an altitude indicator 216 (or altimeter tape) that indicates the current altitude of the aircraft, a zero pitch reference line 218, a pitch ladder scale 220, a compass 222, and an aircraft reference symbol 224, as described in greater detail below. The embodiment shown in FIG. 2 has been simplified for ease of description and clarity of illustration; in practice, embodiments of the primary flight display 202 may also contain additional graphical elements corresponding to or representing pilot guidance elements, waypoint markers, flight plan indicia, flight data, numerical information, trend data, and the like. For the sake of clarity, simplicity, and brevity, the additional graphical elements of the primary flight display PFD 202 will not be described herein.

In an exemplary embodiment, the terrain 204 is based on a set of terrain data that may be stored in database 156, the terrain 204 corresponds to a viewing region proximate the current location of the aircraft 238 that corresponds to the forward-looking cockpit viewpoint from the aircraft. The control module 104 includes or otherwise accesses database 156, and in conjunction with navigational information (e.g., latitude, longitude, and altitude) and orientation information (e.g., aircraft pitch, roll, heading, and yaw) from the navigation system 110, the control module 104 controls the rendering of the terrain 204 on the display system 114 and updates the set of terrain data being used for rendering as needed as the aircraft travels. Moreover, as the aircraft travels (e.g., turns, ascends, descends, rolls, etc.), the graphical representation of terrain 204 and other features of the perspective display can shift to provide a continuously updated virtual representation for the flight crew. It should be appreciated that the perspective view associated with primary flight display 202 need not always include a perspective view of terrain 204. For example, in the absence of terrain data, the perspective view of the display may appear flat, blank, or otherwise void of conformal terrain graphics.

As an aircraft approaches a destination such as an airport, the control module 104 may command the display system 114 to display on the PFD 202 a landing image 206. Landing image 206 may be based on information accessed from the database 156, specifically featuring a target location or runway 228, including the latitude, longitude and altitude, as well as an approach course 230. The PFD 202 may also display a representation of the aircraft 232 showing the location of the aircraft 232 relative to the approach course 230. The resulting landing image 206 is a representation of the runway and the area around the runway, and may be based on information from the imaging system 108.

In the novel embodiments provided herein, a visually enhanced area that is sensor based (i.e., based on the image data) and is responsive to visibility reports at the target landing location is included in the landing image 206. The visually enhanced area is defined by a field of view (FOV) 251, having first dimensions 250, 252 (and FOV 351, FIG. 3. having second dimensions 350, 352). In the provided embodiments, the visually enhanced area is large enough to include the location of runway signatures and any other useful features while accounting for some navigational error. Most runway signatures are quite close to the actual runway; however some variation can exist depending upon the airport. As can be seen, the FOVs in FIG. 2 and FIG. 3 comprise the runway signature 240.

As described above, the imaging system 118 is calibrated such that the FOV 251 is aligned with a particular location within the viewing region of the primary flight display 202 and corresponds to an anticipated line-of-sight for the forward-looking cockpit viewpoint. In described embodiments, the image data may be associated with an identified target landing location or runway. The FOV 251 is positioned within the primary flight display 202 overlying the terrain 204 in a manner that accurately reflects and/or corresponds to the approximate real-world location of the image data obtained by imaging system 118 with respect to the real-world terrain depicted by terrain 204. As mentioned, in an exemplary embodiment, the FOV 251 corresponds to a sensed image (or a frame of video) obtained by an IR video camera or a MMW video camera. In this regard, the FOV 251 may be updated at the refresh rate of the imaging system 118 to provide substantially real-time imagery (or video) for the FOV 251 on the primary flight display 202. Details of symbology or location of markings on flight deck display 200 (as well as the display of the FOV 251) may change form and location from implementation to implementation and display system 114 to display system 114.

When a crew member determines that the enhanced vision display provided by the displayed sensor based image is offering little value for approach and/or landing, the crew member may prefer that it not have a large FOV. In some embodiments, the control module 104 automatically, and without user input, reduces the area of the FOV 251 from first dimensions to second dimensions (FOV 351, FIG. 3). In other embodiments, the control module 104 commands the display system 114 to present a menu of two or more predetermined size options upon determining that there is low visibility; in this scenario, the two or more predetermined FOV size options may dictate the FOV dimensions (i.e., x=350, y=352, and x=250, y=252). The user selection of a size option may be a trigger for the control module 104 to modify the FOV, for example, from the FOV 251 to the user selected FOV size option. In various embodiments, the first dimensions are larger than the second dimensions, and the first and the second dimensions may be related to visibility requirements outlined by federal aviation association (FAA) instrument landing system (ILS) categories.

Figure 3:
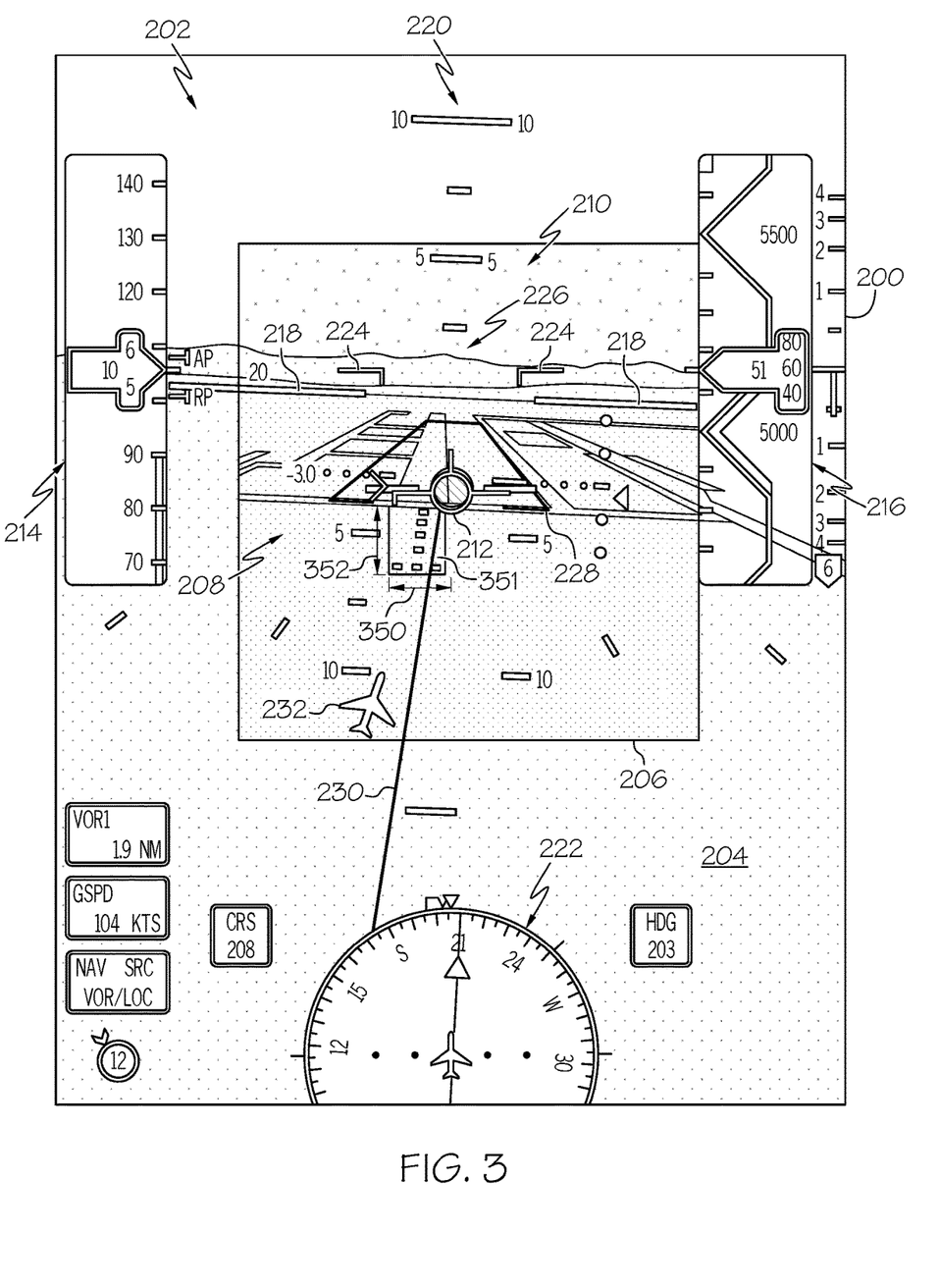
FIG. 3 is an image generated by the vehicle system of FIG. 1 according to an exemplary embodiment.

Turning now to FIG. 3, and with continued reference to FIG. 2, like objects are not described again. FIG. 3 represents an image taken at a point in time after the control module 104 has reduced the dimensions of the FOV 251. In FIG. 3, the FOV 351 has second dimensions (x=350, y=352), which means that FOV 351 is smaller than FOV 251. The FOV 351 may be substantially centered on the runway signature 240.

The embodiments shown in FIGS. 2-3 depict a technological improvement to the conventional display of enhanced flight vision information on an aircraft flight deck display. Specifically, the novel control module 104 realizes enhanced flight vision systems (EFVS) and methods that perform visibility-based modification of the FOV 251 of a displayed sensor based image.

Figure 4:
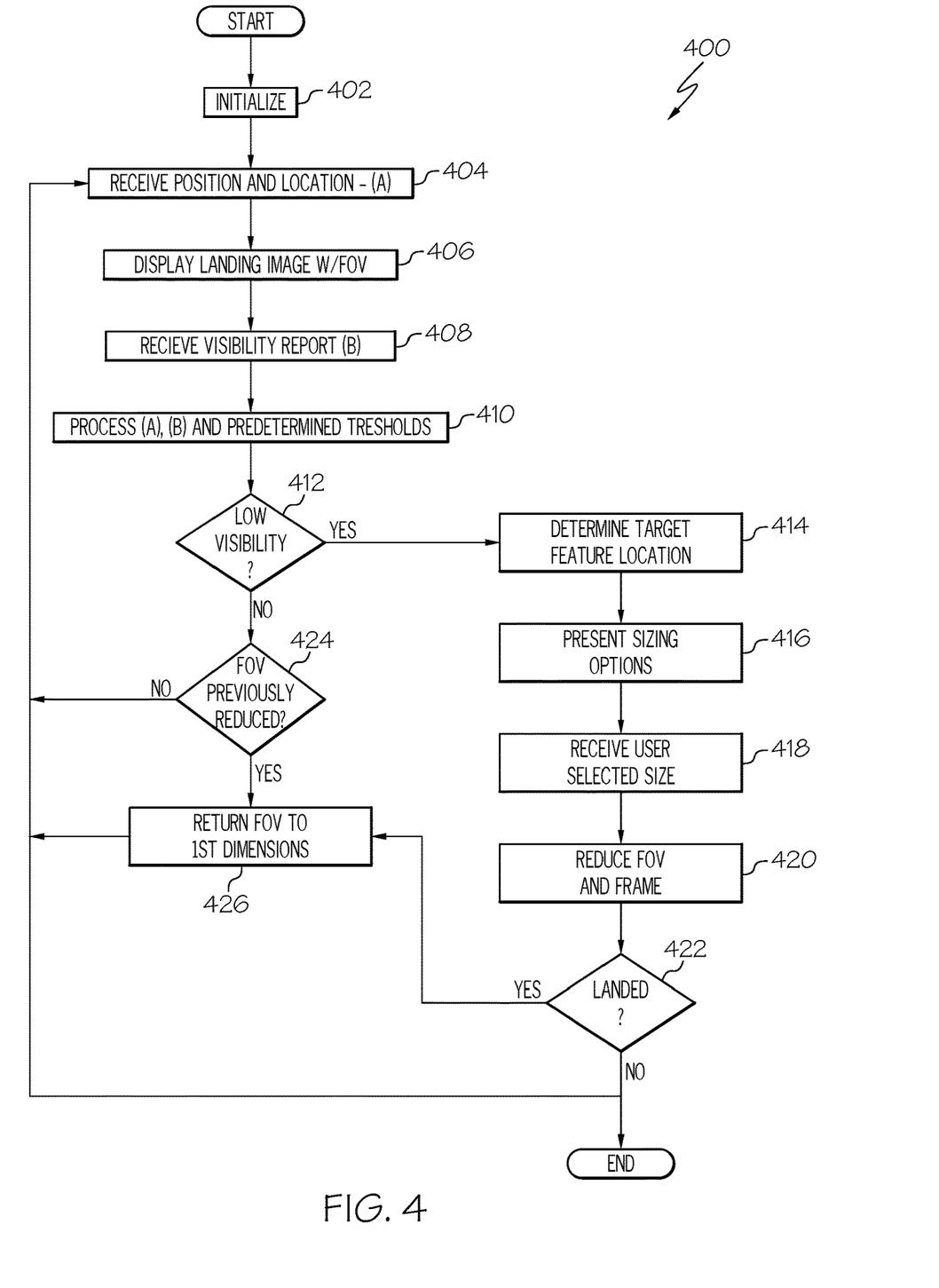
FIG. 4 is a flow chart for a method for enhanced vision in a vehicle, according to a further exemplary embodiment.

In a further exemplary embodiment, the vehicle system 102 discussed above may be used to implement a method 400 for adjusting the field of view FOV 251 of a sensor image on an enhanced flight vision system display, as shown in the flow chart of FIG. 4. For illustrative purposes, the following description of method 400 may refer to elements mentioned above in connection with FIG. 1. In practice, portions of method 400 may be performed by different components of the described system. It should be appreciated that method 400 may include any number of additional or alternative tasks, the tasks shown in FIG. 4 need not be performed in the illustrated order, and method 400 may be incorporated into a more comprehensive procedure or method having additional functionality not described in detail herein. Moreover, one or more of the tasks shown in FIG. 4 could be omitted from an embodiment of the method 400 as long as the intended overall functionality remains intact.

The method starts, and at 402 the control module 104 is initialized. As mentioned above, initialization may comprise uploading or updating instructions and applications 160, program 162, stored variables 164, and the various lookup tables stored in the database 156. Generally, various thresholds associated with respective visibility influencers may be stored as a look up table or set of predetermined thresholds (i.e., rain, fog, snow, smog, dust, particulate matter of various sizes, gasses, and fumes may each have a respective predetermined threshold). Stored variables 164 may also include various shapes and sizes for FOV windows, including those associated with FAA ILS categories. In some embodiments, the program 162 includes additional instructions and rules for rendering information differently based on type of display device in display system 114.

At 404, vehicle position and location information is received from the navigation system 110. At 406, upon determining that the aircraft is in an approach and landing operation, the landing image 206 is displayed on the PFD 202. At 406, map features may be retrieved from the database 156 and processed with received vehicle position and location information, to identify a runway or landing location. Image data may be continuously received from the imaging system 108, and the method may continuously generate display commands for the landing image 206. The landing image 206 is based on the image data, and the landing image 206 includes a visually enhanced area defined by a field of view (FOV). Accordingly, at 406, dimensions for the FOV are also determined. Responsive to the display commands, the landing image 206 and respective FOV are displayed on the PFD 202. The first pass through 406 is the initial determination of FOV dimensions, resulting in the FOV 251 having first dimensions 250, 252; subsequent passes through 406 may comprise modifications to the dimensions of the FOV as described herein.

At 408, the visibility report for the target location or runway is received. At 410, the visibility report is processed with the novel rules and various predetermined thresholds defining low visibility. It is understood that the method is capable of continuously receiving visibility reports and processing them to determine when low visibility conditions exist. It is also understood that processing the visibility report with the predetermined thresholds may comprise converting values and/or units in the visibility report, and that determining low visibility may further comprise aggregating individual visibility values and scoring overall visibility in accordance with the novel rules of the program 162. At 412 the method 400 determines whether low visibility conditions exist at the target location. At 414, when low visibility conditions exist, the method 400 determines or estimates a target feature location. The target feature location may be retrieved from the database 156. The target feature is associated with the target landing location, and in various embodiments, the target feature is the runway signature. In other embodiments, the target feature is a ground feature for which to center a reduced size FOV around during the low visibility condition.

At 416, two or more FOV size options (i.e., dimensions) are presented on the display system 114. The FOV size options may define shape as well as area. As mentioned above, the FOV size options may be tied to a FAA ILS category. At 418 the method receives a user selected FOV size option. The user selected size option may reflect user selected visibility conditions, and user selected portions of the sensor image to be displayed. In the various embodiments that present FOV size options to a user, the tasks at 416 and 418 may occur earlier in the method, such as, at initialization. From 418, and in embodiments that automatically, and without user selections, reduce FOV dimensions, at 420 the FOV 251 is reduced from first dimensions to FOV 351 with second dimensions, generally keeping a geometric center on the target feature location. The reduced FOV 351 at 420 indicates that the control module 104 has determined that low visibility conditions exist at the target location, and therefore its best to reduce the area of the displayed sensor image (i.e., the image based on the image data). At 422, the method may determine that the aircraft has landed and may modify the FOV 351 by returning it to the first dimensions at 426. If the aircraft has not landed at 422, the method may return to receiving position and location information at 404, or end.

If low visibility conditions are not met at 412 (i.e., the visibility is good), the method checks whether the FOV was previously reduced at 424 (i.e., FOV 351) and if it was, the method modifies the FOV 351 by returning the FOV to the first dimensions at 426 (i.e., FOV 251). This accounts for initially determined low visibility at the target landing location (i.e., on a first pass through 412, visibility is determined to be below the respective low visibility thresholds), but then subsequently (but still before landing) the visibility is determined to have improved (i.e., low visibility conditions no longer exist) at the target landing location. If and when the visibility is not "low," it is determined to be good; in good visibility conditions, the preference is that the FOV 251 have first dimensions.

Accordingly, the exemplary embodiments discussed above provide an enhancement over conventional Enhanced Flight Vision Systems (EFVS). The exemplary embodiments modify, responsive to visibility information, the Field Of View (FOV) of a sensor based image on a PFD of an aircraft flight deck display.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A control module for an enhanced vision system on an aircraft, comprising:
   a computer readable storage media comprising airport features; and
   a processor coupled to the computer readable storage media, the processor configured to:
      receive aircraft latitude, longitude, and orientation from a navigation system;
      process the aircraft latitude, longitude, and orientation with the airport features to determine a landing location;
      receive imaging data associated with the landing location from an imaging system;
      command a display system to render a landing image of the landing location based on the image data, the landing image having therein a visually enhanced area that includes the landing location and a runway signature, the visually enhanced area defined by a field of view (FOV) having first dimensions;
      receive an airport visibility report for the landing location from an external source;
      process the received airport visibility report with stored predetermined thresholds for rain, fog, snow, smog, and particulate matter defining low visibility to determine that low visibility conditions exist at the landing location; and
      responsive to determining that low visibility conditions exist at the landing location,
      estimate a target feature location associated with the landing location, center the visually enhanced area around the estimated target feature location, and reduce the FOV from the first dimensions to second dimensions.

2. The control module of claim 1, wherein the processor is further configured to:

responsive to determining that low visibility conditions exist at the landing location, present a menu of two or more FOV size options, receive a user selected FOV size option, and wherein the second dimensions are provided by the user selected FOV size option.

3. The control module of claim 2, wherein the first dimensions and the second dimensions are each related to visibility requirements outlined by federal aviation association (FAA) instrument landing system (ILS) categories.

4. The control module of claim 2, wherein, when the FOV has second dimensions, the processor is further configured to return the FOV to the first dimensions responsive to determining that low visibility conditions no longer exist.

5. The control module of claim 1, wherein the processor is further configured to modify the FOV by returning it to the first dimensions responsive to determining that the aircraft has landed.

6. The control module of claim 1, wherein:
determining that low visibility exists includes aggregating individual visibility values for rain, fog, snow, smog, and particulate matter.

7. An enhanced vision system for an aircraft, the system comprising:
an imaging system configured to generate image data associated with the landing location and corresponding to a forward looking viewpoint of the aircraft;
a display system comprising a primary flight display (PFD); and
a control module comprising a memory device, a database, and a processor, the control module coupled to the imaging system and the display system, and configured to:
receive latitude, longitude, and orientation of the aircraft;
process the aircraft latitude, longitude, and orientation with map features to identify a runway;
command the display system to render on the PFD a landing image of the runway based on the image data, the landing image having therein a visually enhanced area that includes the runway and a runway signature, the visually enhanced area defined by a field of view (FOV) with first dimensions; and
receive an airport visibility report associated with the runway;
process the airport visibility report with stored predetermined thresholds defining low visibility to determine that a low visibility condition is underway at the runway; and
responsive to determining that the low visibility condition is underway at the runway,
estimate a target feature location associated with the runway; and
command the display system to center the visually enhanced area around the estimated target feature location and reduce the FOV from the first dimensions to second dimensions.

8. The system of claim 7, wherein, when the FOV has second dimensions, the control module is further configured to modify the FOV by returning it to the first dimensions responsive to determining that the aircraft has landed.

9. The system of claim 7, wherein the control module is further configured to:
command the display system to present a menu of two or more FOV size options responsive to determining the low visibility condition exists at the runway.

10. The system of claim 9, further comprising a user input device, and wherein the control module is further configured to receive a user selected FOV size option and wherein the second dimensions are provided by the user selected FOV size option.

11. The system of claim 10, wherein the first dimensions and the second dimensions are each related to visibility requirements outlined by federal aviation association (FAA) instrument landing system (ILS) categories.

12. The system of claim 11, wherein, when the FOV has second dimensions, the control module is further configured to return the FOV to the first dimensions responsive to determining that low visibility conditions at the runway no longer exist.

13. The system of claim 7, wherein:
determining that low visibility exists includes aggregating individual visibility values for rain, fog, snow, smog, and particulate matter.

14. A method for an enhanced vision system on an aircraft, the method comprising:
at a control module comprising a processor and a memory,
receiving image data from an imaging system, the image data corresponding to a forward looking viewpoint of the aircraft;
receiving, from a navigation system, position and location information for the aircraft;
processing the aircraft position and location information with map features to identify a runway;
receiving, from an external source, an airport visibility report associated with the runway;
generating display commands for a landing image associated with the runway, and having therein a visually enhanced area of first dimensions that surrounds the runway and a runway signature, the visually enhanced area based on the image data, aircraft position and location information, and map features;
processing the received airport visibility report with stored predetermined thresholds for rain, fog, snow, smog, and particulate matter defining low visibility to determine that low visibility conditions currently exist at the runway; and
responsive to determining that low visibility conditions currently exist at the runway, estimating a location of the runway signature, reducing dimensions of the visually enhanced area to second dimensions, and centering the reduced dimensioned visually enhanced area around the runway signature; and
at a display system comprising a primary flight display (PFD),
rendering the landing image on the PFD responsive to receiving the display commands.

15. The method of claim 14, further comprising, at the control module:
modifying the FOV to have first dimensions responsive to determining that the aircraft has landed.

16. The method of claim 15, further comprising, at the control module:
commanding the display system to present a menu of two or more FOV size options responsive to determining the low visibility condition exists;
receiving a user selected FOV size option; and
wherein the second dimensions are provided by the user selected FOV size option.

* * * * *